United States Patent [19]

Downing et al.

[11] 4,390,085
[45] Jun. 28, 1983

[54] AUTOMATIC MECHANICAL BRAKE ADJUSTER

[75] Inventors: Terry R. Downing; John M. Zorns, both of Glenwood; Winfred C. Croft, Park Forest South, all of Ill.

[73] Assignee: Allis-Chalmers Corporation, Milwaukee, Wis.

[21] Appl. No.: 295,321

[22] Filed: Aug. 24, 1981

[51] Int. Cl.³ .................... F16D 55/08; F16D 65/52
[52] U.S. Cl. .................... 188/72.9; 188/79.5 K; 188/196 B; 74/577 S
[58] Field of Search .............. 188/21, 71.7, 71.8, 188/72.9, 196 B, 196 BA, 79.5 GE, 79.5 K, 79.5 GT, 79.5 S; 192/111 A, 46; 74/577 S

[56] References Cited

U.S. PATENT DOCUMENTS

| | | | |
|---|---|---|---|
| 405,469 | 6/1889 | Glenn | 74/577 S |
| 1,034,891 | 8/1912 | Disch | 74/577 S |
| 1,132,464 | 3/1915 | Elmore | 74/577 S |
| 1,427,223 | 8/1922 | Miller | 74/577 S |
| 1,767,593 | 6/1930 | Laabs | 74/577 S |
| 1,989,207 | 1/1935 | McConkey et al. | 188/196 B |
| 2,463,344 | 3/1949 | Williams | 74/577 S |
| 3,077,791 | 2/1963 | Gray | 74/577 S |
| 3,195,689 | 7/1965 | Ryskamp | 188/79.5 GT |
| 3,374,867 | 3/1968 | Pirard | 188/79.5 K |
| 3,545,573 | 12/1970 | Barton | 188/72.9 |
| 3,659,681 | 5/1972 | Harvey | 188/72.9 |
| 3,831,878 | 8/1974 | Griffin | 74/577 S |
| 3,850,268 | 11/1974 | Guettier | 188/71.8 |
| 3,895,538 | 7/1975 | McGregor | 188/79.5 K |
| 4,121,701 | 10/1978 | Gestkoff | 188/196 B |
| 4,161,240 | 7/1979 | Pringle | 188/196 BA |

FOREIGN PATENT DOCUMENTS

| | | | |
|---|---|---|---|
| 55-54734 | 4/1980 | Japan | 188/196 B |
| 582971 | 12/1946 | United Kingdom | 188/79.5 K |

Primary Examiner—Douglas C. Butler
Assistant Examiner—R. R. Diefendorf
Attorney, Agent, or Firm—Charles L. Schwab

[57] ABSTRACT

An automatic mechanical brake adjuster for a walk-behind lift truck includes a lever (59) with two relatively pivoted parts (58,76) including a ratchet mechanism (96) therebetween. The ratchet mechanism (96) includes a ratchet wheel segment (77) and cooperating pawls (101-104). The brake adjuster also includes an extensible link (126) which determines the brake shoe back-off distance and cooperates with the ratchet mechanism (96) in effecting pivotal adjustment between the lever parts (58,76).

2 Claims, 5 Drawing Figures

AUTOMATIC MECHANICAL BRAKE ADJUSTER

BACKGROUND OF THE DISCLOSURE

This invention relates to an automatic mechanical brake adjuster and more particularly to the employment of a tooth and pawl or ratchet mechanism which provides increment adjustments together with an adjustable link which controls the back-off distance for the brake shoe. Heretofore various mechanical brake adjusting mechanisms have been suggested. In U.S. Pat. No. 3,195,689, for instance, an adjustable link maintains a relatively uniform back-off distance for brake shoes. The use of ratchet-action slack adjusters is shown in U.S. Pat. Nos. 4,161,240; 1,989,207 and 3,895,538. The present invention is an improvement over the brake mechanism shown in U.S. Pat. No. 3,659,681 which does not employ an automatic slack adjusting mechanism.

BRIEF DESCRIPTION OF THE INVENTION

The self-adjusting mechanical brake adjuster of the present invention is particularly useful in a braking mechanism for a wheel rotatably mounted on a support which in turn is mounted on a vehicle frame for steering movement about a vertical steering axis. A rotating disc, associated with the wheel, rotates whenever the wheel rotates and a brake shoe of the braking mechanism is in confronting relation to one axial side of the disc. A manually controlled operating linkage for applying and releasing the brake includes an operating member having a first part in association with the brake shoe and a second part which is movable relative to the first part. The connection between the two parts includes teeth on one part and pawls on the other part permitting relative movement of the parts in one direction but preventing relative movement of the parts in the opposite direction. Teeth engaging fingers of the pawls are spaced from one another a distance which is not a multiple of the spacing between the teeth, thereby affording increments of adjustment in the relative position of the parts, which are less than the spacing between the teeth.

Preferably an adjustable link is included to control the back-off distance of the brake shoe. The link extends between and has connections with the part associated with the brake shoe and the support. One of the connections includes a lost-motion connection which determines the back-off distance for the brake shoe. The force imparted to the member to apply the brake is sufficient to cause the adjustable link to extend, and the force of the back-off spring for the brake shoe is insufficient to cause the adjustable link to retract in length.

The pawls may be positioned side-by-side, and also in circumferentially-spaced relation to one another about a ratchet wheel segment, so that four pawls each afford an increment of the automatic brake adjustment equal to approximately one-fourth the spacing between the teeth on the ratchet wheel segment.

BRIEF DESCRIPTION OF THE DRAWINGS

The one embodiment of the present invention is illustrated in drawings in which.

DETAILED DESCRIPTION OF THE DRAWINGS

Figure 1:
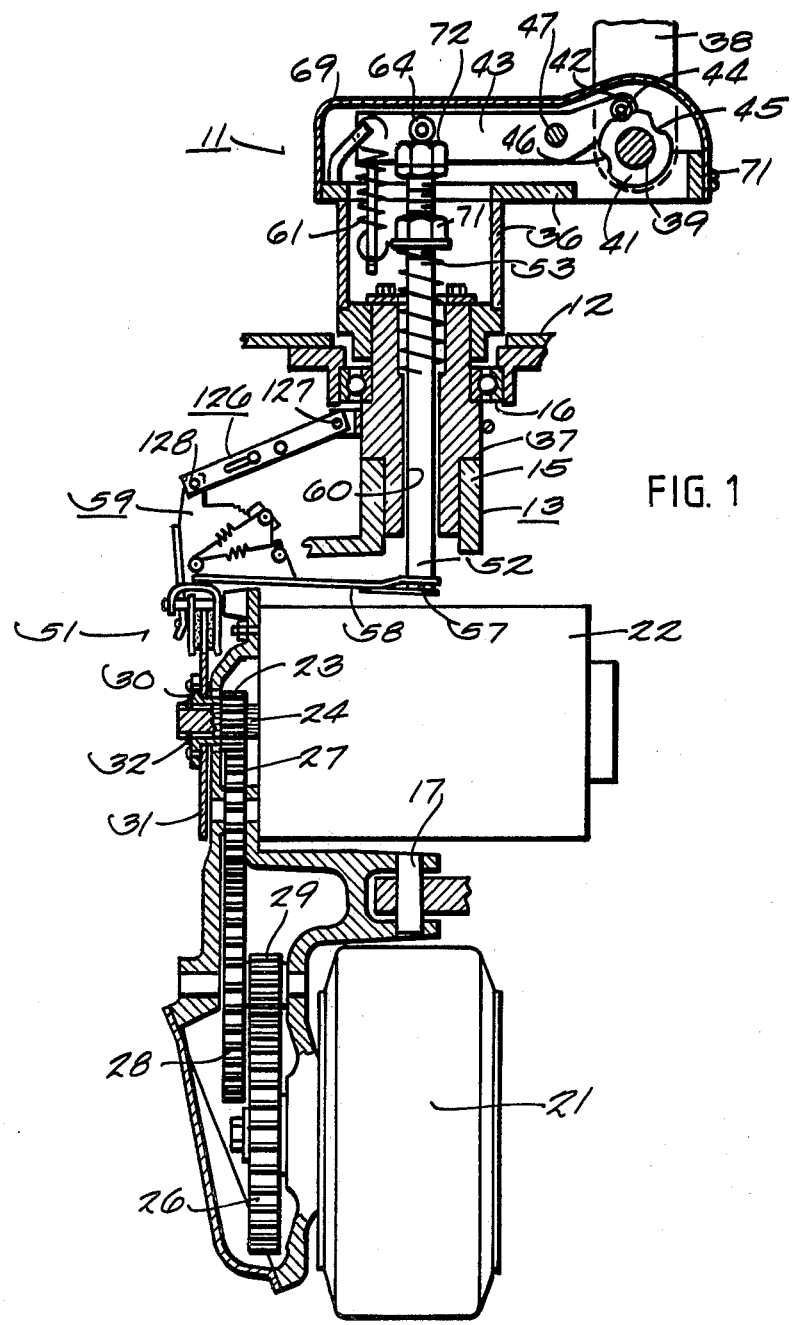
FIG. 1 is a section view through the steer axis of a motorized wheel unit for a walk-behind lift truck.

Referring to FIG. 1, the present invention is shown incorporated in a steerable single wheel drive assembly 11 of a walk-behind lift truck. The drive or motor wheel assembly 11 includes a support 13 which is rotatably mounted on a main frame 12 of the truck by an antifriction bearing 16 and a pin 17. It should be understood that the lower cast housing 15 of the support 13 has been rotated 90° in relation to the upper part for purposes of illustration and description. A drive wheel 21 is rotatably mounted on the lower end of housing 15 and has a final drive gear 26 fixed thereto. The drive wheel 21 is driven by an electric DC motor 22 through a gear train which includes a drive gear 23 splined to the motor output shaft 24, a final drive gear 26 and intermediate gears 27, 28 and 29. Gears 28 and 29 form a gear cluster. The horizontally disposed output shaft 24 of the motor 22 carries a brake disc 31 having a hub 30 which has an internal spline in cooperative engagement with an externally splined end of the shaft 24. The disc 31 is held in place on the shaft by a snap ring 32.

A handle support member 36 is rigidly secured to the neck 37 of the housing 15 and a control handle 38 is pivotally connected to the handle support member 36 by a pin 39 fixed to the handle. The pin 39 carries a brake operating cam 41. A suitable cover 69 is secured to support member 36 by capscrews 71, only one of which is shown. In the upright position of the handle 38, as illustrated, and in two other rotated positions, a roller 42 rotatably connected to one end of a pivot link 43 fits in pockets 44, 45 and 46 of the cam to achieve braking of the motor shaft 24 by a brake assembly 51. The link 43 is pivotally connected by a pin 47 to the handle support member 36 in spaced relation to the pin 39. The link 43 is biased by a light tension spring 61 to cause the roller 42 to bear against the cam 41. The link 43 carries a roller 64 which is in vertical thrust transmitting engagement with the upper end of a vertical brake operating rod 52.

The rod 52 is guided in a bore 60 in the support 13 so as to have a substantially coaxial relationship with the bearing 16 and pin 17. The lower end of the rod 52 carries a transverse pin 57 in vertical thrust transmitting engagement with a bifurcated end of a part 58 of a two-part member 59. The upper end of the rod 52 is biased upwardly by a relatively strong coil spring 53 which provides the braking force.

The upward force exerted by the spring 53 can be adjusted by turning a nut 71 on an upper threaded part of the rod 52 and the position of the upper end of the rod 52 relative to the roller 64 can be adjusted by rotating the nut 72 on the upper threaded end of the rod. The spring 53 is sufficiently strong to exert enough force to apply the brake mechanism 51 whenever a roller 42 registers with any one of the notches 44, 45, 46 in the cam 41 of the control handle 38. Thus, the braking mechanism is under manual control of the operator of the walk-behind lift truck.

Figures 2, 3:
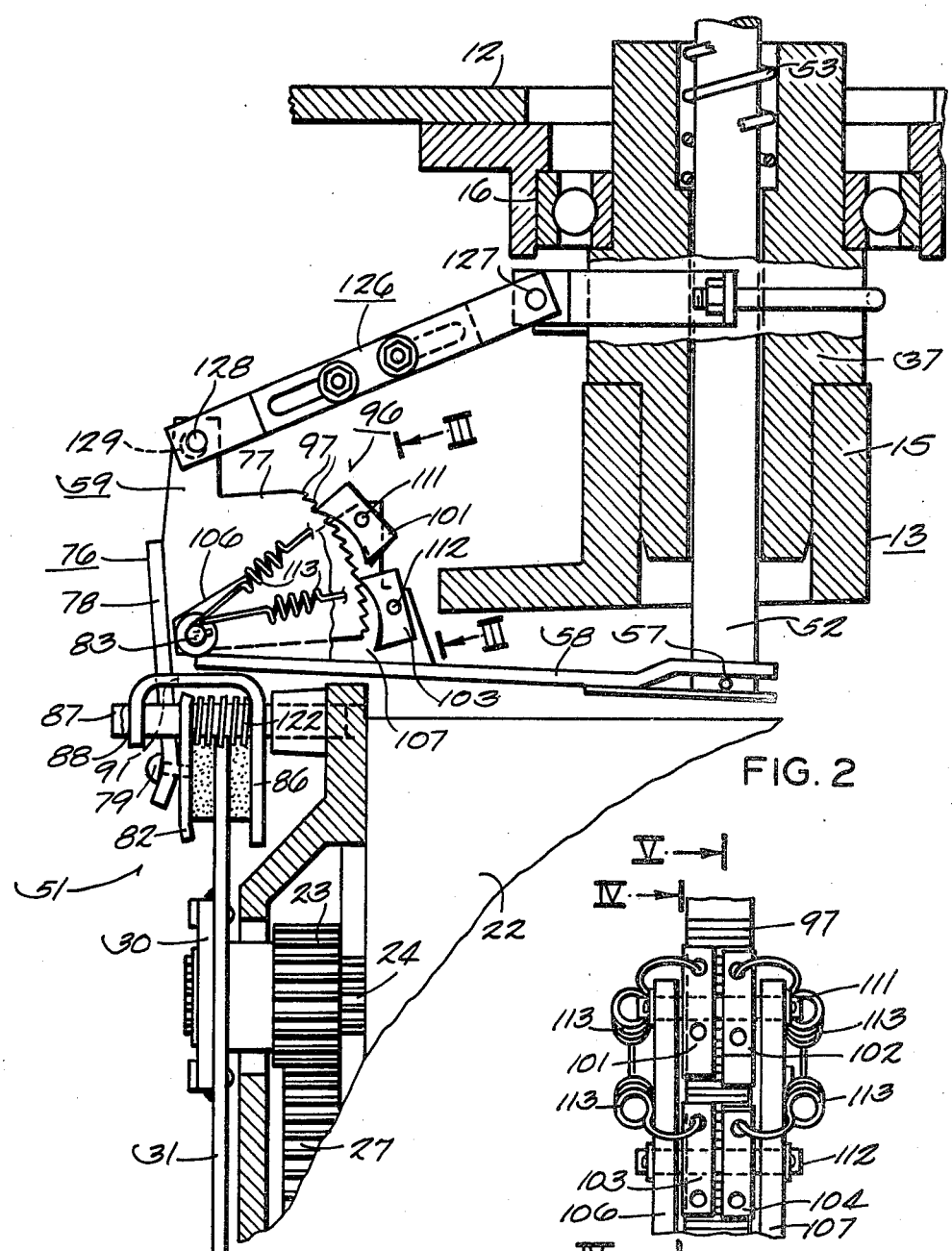
FIG. 2 is an enlarged view of a portion of FIG. 1 showing a brake mechanism.
FIG. 3 is a view taken along the line III—III in FIG. 2.

The two-part member or lever 59, as is more clearly illustrated in FIG. 2, includes a part 76 having a ratchet wheel segment 77 secured as by welding to a downwardly extending portion 78. Portion 78 engages a brake shoe 82 and carries a screw 79 at its lower end in registry with an opening 81 in a brake shoe 82. The part 76 is pivotally connected to part 58 by a pivot pin 83 on a horizontal axis parallel to the plane of the brake disc 31. The brake shoe 82 and an oppositely acting brake shoe 86 are slidably mounted on a pair of pins 87, 88 and the brake shoe 86 includes a vertical opening 91 through which the downwardly extending portion 78 of the part 76 extends. The member or lever 59 rocks about its contact point 121 with the side of the opening 91 as brake engagement and disengagement are effected. A more detailed description of the brake shoes and their operation is set forth in U.S. Pat. No. 3,659,681 which is incorporated by reference.

Figure 4:
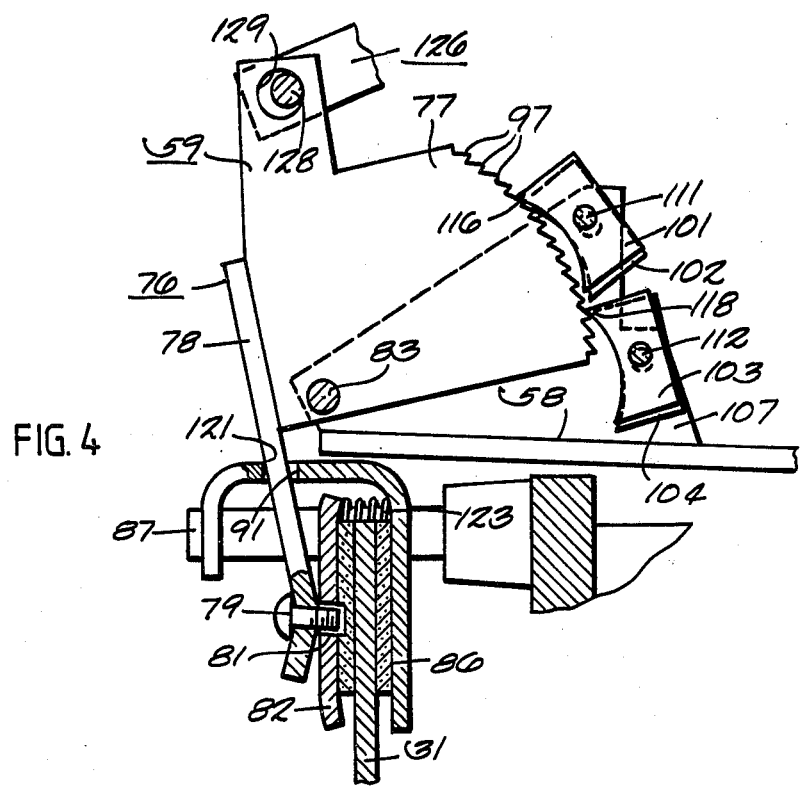
FIG. 4 is a section view taken along the line IV—IV in FIG. 3.
Figure 5:
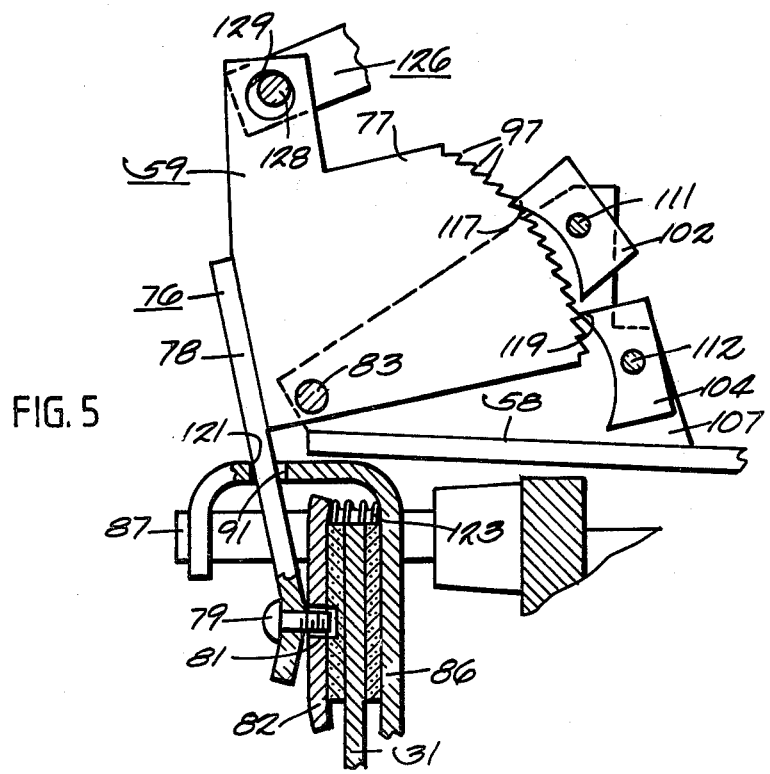
FIG. 5 is a section view taken along the line V—V in FIG. 3.

Referring also to FIGS. 3–5, ratchet mechanism 96 is included in the lever 59 between the parts 76 and 58 to provide an automatic mechanical adjustment of the lever 59. The ratchet wheel segment 77 on the part 76 includes a plurality of circumferentially spaced teeth 97 in confronting relation to four pawls 101, 102, 103, 104 which are pivotally mounted on spaced flanges 106, 107 of the part 58 by a pair of parallel pins 111, 112. Individual tension springs 113 are connected to pin 83 and to the independently operable pawls 101–104 to hold the tips or fingers 116, 117, 118, 119 in contact with the ratchet wheel segment 77 whereby proper engagement of the pawls 101–104 with the teeth 97 is maintained. The pawls are constructed and mounted so their fingers 116–119 engage the ratchet segment 77 at circumferentially spaced intervals, not multiples of the tooth spacing, so as to provide four increments of automatic brake adjustment for each tooth spacing.

OPERATION

In the drawings, the braking mechanism is shown in its brake-engaged position. The roller 42 is in notch 44 of the cam 41 thereby permitting the lever 43 to rotate about pin 47 against the tension of spring 61 and under the influence of much stronger spring 53. The brake applying spring 53 shifts the rod 52 upwardly causing the lever 59 to rock or pivot relative to the support 13 by way of its engagement at the fulcrum point 121, as shown in FIGS. 4 and 5, at an edge of the slot 91 in brake shoe 86. The lower end of the part 76 of the lever 59 urges the brake shoe 82 into engagement with the friction member in the form of brake disk 31. The force applied by the lever 59 at the fulcrum point 121 causes the brake shoe 86 to move into engagement with the opposite face of the brake disk 31.

When the handle 38 is rotated to move the roller 42 out of the notch or recess 44 in the cam 41, the lever 43 will be rotated and roller 64 thereon will force the rod 52 downwardly causing the lever 59 to be pivoted in a vertical plane transverse to the vertical plane of the brake disc 31. The back-off springs 122, 123 assist in moving the shoes away from the brake shoes 82, 86 a distance referred to as back-off distance. The back-off springs 122, 123 are not strong enough to contract the adjustable link 126, and thus, the link 126 serves to limit the back-off distance to that permitted by the lost-motion connection afforded by an enlarged opening 129 in part 76 and a pin 128 in one bifurcated end of the link 126. The other bifurcated end of the linear adjustable link 126 is pivotally connected to the support 13 by pin 127. The link 126 is constructed as shown and described in U.S. Pat. No. 3,195,689 incorporated by reference.

As wear occurs, the lever 59 must pivot through a greater arc to engage the brake. Since one end of the adjustable link 126 is connected to the support 13, the opposite end of the link 126, after the slack of the lost-motion connection is taken up, will be extended by the force exerted by spring 53. When the brake is disengaged, part 76 of the lever 59 will not be able to swing back as far because the extension of link 126 and part 58 of the lever 59 will pivot downwardly relative to part 76 about the pivot pin 83. Upon a predetermined extension of the link 126, the pivoting of the parts 58, 76 of the lever 59 will be sufficient to position the finger 119 of pawl 104 on the lower abutting side of a tooth 97. At any one time, only one of the fingers 116–119 engages a tooth. As additional wear occurs, fingers 103 and 101 will sequentially become the tooth-engaging fingers of the ratchet mechanism. By positioning the two side-by-side pawls 101, 102 on a common shaft or pivot pin 111 with their staggered fingers 116, 117 engageable with the same tooth, and by pivoting the two side-by-side pawls 103, 104 on a parallel, circumferentially spaced pivot pin 112 with their staggered fingers 118, 119 engageable with a different tooth of the ratchet wheel segment 77, four increments of automatic brake adjustment per tooth are available. Placing the pawls in side-by-side relationship permits a compact, economical design, particularly suitable for a walk-behind lift truck. The rachet mechanism 96 and adjustable link 126 cooperate to automatically adjust the brake operating lever 59 so as to afford effective braking throughout the wear life of the brake shoes even though the amount of brake application movement (the pivoting of lever 43 and reciprocation of rod 52) is always the same.

The embodiments of the invention in which an exclusive property or privilege is claimed are defined as follows:

1. In a vehicle having a wheel rotatably mounted on a support which, in turn, is rotatably mounted on a frame portion of said vehicle for steering movement about a generally vertical axis and including a rotatable brake disk which rotates whenever the wheel rotates, a braking mechanism characterized by a brake shoe in confronting relation to an axial face of said disk, an operator-controlled brake operating linkage operable to transmit brake engaging force when moved in one direction, spring means biasing said linkage in said one direction, a lever mounted on said support for pivotal movement between a brake engaged position and a brake disengaged position, said lever including relatively rotatable parts and a ratchet mechanism therebetween one of said relatively rotatable parts being in operating relationship with said shoe, and back-off distance limiting means including an adjustable link extensible upon being subjected to predetermined elongating force, opposite ends of said link being secured to said support and said one part by pivot connections, one of said pivot connections being a lost-motion connection which determines the back-off distance for said brake shoe.

2. The vehicle of claim 1 wherein said ratchet mechanism includes a rachet wheel segment on one of said relatively rotatable parts presenting circumferentially spaced teeth and pawls on the other of said relatively rotatable parts in engagement with said teeth, said pawls being circumferentially spaced from one another a distance other than a multiple of the circumferential spacing of said teeth on said ratchet wheel segment whereby the increment of rotative adjustment between said relatively rotatable parts is less than the spacing between said teeth.

* * * * *